United States Patent [19]
Huber

[11] Patent Number: 4,871,052
[45] Date of Patent: Oct. 3, 1989

[54] CONVEYOR BALL UNIT

[75] Inventor: Thomas Huber, Iffeldorf, Fed. Rep. of Germany

[73] Assignee: Bavaria Cargo Technologie GmbH, Munich, Fed. Rep. of Germany

[21] Appl. No.: 195,340

[22] Filed: May 18, 1988

[30] Foreign Application Priority Data

Feb. 22, 1988 [DE] Fed. Rep. of Germany ....... 3805494

[51] Int. Cl.$^4$ ............................................. B65G 13/00
[52] U.S. Cl. .............................. 193/35 MD; 193/35 B; 16/26
[58] Field of Search ........... 193/35 SS, 35 B, 35 MD; 16/24-27; 384/49, 490, 491, 495; 244/118.1, 137.1

[56] References Cited

U.S. PATENT DOCUMENTS

| 3,466,697 | 9/1969 | Cain et al. | 16/26 |
| 3,739,894 | 6/1984 | Hinman . | |
| 4,689,847 | 3/1986 | Huber | 16/26 |
| 4,696,583 | 9/1987 | Gorges | 16/26 |

FOREIGN PATENT DOCUMENTS 1297185  5/1962  France ........................... 193/35 MD
1266501  3/1972  United Kingdom .................... 16/24

Primary Examiner—Joseph E. Valenza
Attorney, Agent, or Firm—Sughrue, Mion, Zinn, Macpeak & Seas

[57] ABSTRACT

A conveyor ball unit for use in a conveyor track for example for moving freight material comprises a housing accommodating a conveyor ball member supported in a mounting shell member by way of a plurality of mounting balls. The mounting shell member is supported resiliently by spring means. To prevent the mounting shell member with conveyor ball member supported therein tilting in the housing under the effect of a load thereon, upon resilient deflection of the spring, with the result of the conveyor ball member becoming jammed, the conveyor ball member is supported in the mounting shell member only at an annular region thereof and the mounting shell member is itself supported on the spring means in that annular region. The spring means comprises a plurality of plate springs, with the outer periphery thereof being held in concentric relationship in the housing, thereby providing that the conveyor ball member and mounting shell member are self-centering in the housing, to reduce the risk of jamming.

5 Claims, 3 Drawing Sheets

CONVEYOR BALL UNIT

BACKGROUND OF THE INVENTION

Conveyor tracks are widely used in a great variety of different situations, which generally involve moving articles from one location to another such as moving freight material for example in the freight compartment or hold of a freight aircraft, for the movement of freight containers when loading and unloading the aircraft. One form of such a conveyor track comprises a plurality of rotatable balls on which the freight containers can roll along the track. Such support ball units are subject to a number of requirements, in particular that they are substantially maintenance-free and very robust, while nonetheless being of comparatively light weight.

As is known from U.S. Pat. No. 3,739,894, one form of a conveyor ball unit for the movement of freight on a conveyor track comprises a generally hollow-cylindrical housing which has a vertical center axis, with a conveyor ball which projects upwardly beyond the upward open end of the housing and which is mounted rotatably in concentric relationship with the center axis on a plurality of mounting balls in a mounting shell member. A ball guide means embraces the conveyor ball in an annular configuration from above, to secure the conveyor ball and the mounting balls movably in the mounting shell member. A spring means which bears against the housing resiliently biases the mounting shell member upwardly from below, with the conveyor ball, the mounting balls and the mounting shell member being movable as a unit within the housing. That unit can be urged downwardly along the line of the center axis of the arrangement, against the force of the above-mentioned spring means. The housing itself is releasably fixed to a panel or bed portion of the conveyor track in which the conveyor ball unit is used. In that construction, the spring means is in the form of a coil spring disposed between the bottom wall portion and the rim of the mounting unit in the region of the peripheral edge of the mounting shell member, to urge the mounting unit upwardly against an annular abutment shoulder in the housing when the ball is in the non-loaded condition, whereby the conveyor ball thus projects upwardly beyond the surface of the panel or bed portion of the conveyor track, through the central opening in the arrangement. When the ball is subjected to a loading by a freight container which is carried thereon, the conveyor ball together with the entire mounting assembly therefor can be urged downwardly into the housing, against the force of the coil spring, until the underneath surface of the mounting shell member comes into contact with a suitable abutment formed in the housing.

It has been found in practice however that that construction gives rise to the difficulty that the conveyor ball is frequently subjected to a loading not only by purely vertically downwardly directed forces but in general also by lateral thrust forces which have to be carried by the rim portion of the upper opening of the ball guide arrangement. The ball guide arrangement must therefore be of a very strong construction and must be a very accurate fit around the conveyor ball. In addition, when the conveyor ball is subjected to a loading by a lateral force component, it frequently happens that the mounting assembly is urged downwardly in a tilted condition in the housing as the coil spring, by virtue of its very nature, cannot withstand lateral forces but easily deflects under the influence thereof. If, from a tilted position of that nature, the mounting unit is urged upwardly in the housing again by the force of the coil spring, it may then happen that the upper annular boundary flange of the ball guide arrangement may strike against the underside of an annular shoulder formed at the upper edge of the opening of the housing so that the mounting unit and the conveyor ball can no longer return to their normal rest or inoperative position, that is to say the position that the components assume when the conveyor ball is not subjected to the weight of a freight container or the like thereon. In that case the conveyor ball unit jams and has to be restored to its normal operating position manually by operator intervention. In such a situation the conveyor ball unit may also suffer from damage.

Furthermore, the above-discussed conveyor ball unit is made entirely of metal so that it tends to be of substantial weight. Furthermore, because of the necessarily accurate fit between the ball guide arrangement and the conveyor ball itself, manufacture of that conveyor ball unit requires a large amount of machining and just slight amounts of damage to the ball guide arrangement under the rough conditions of use which are frequently encountered in a freight loading and unloading situation may result in a high level of resistance to satisfactory movement of the ball so that the ball is unable to perform its load-supporting and moving function satisfactorily.

SUMMARY OF THE INVENTION

An object of the present invention is to provide a conveyor ball unit which is at least less substantially afflicted by the problems discussed above.

Another object of the present invention is to provide a conveyor ball unit which is less likely to suffer from tilting and consequential jamming of the ball mounting arrangement in its housing.

Still another object of the present invention is to provide a conveyor ball unit which is better able to carry the various forces to which it is likely to be subjected in operation.

Yet another object of the present invention is to provide a conveyor ball unit for a conveyor track, which is of such a structure as to provide for easy rolling movement of the ball of the conveyor ball unit, while being of light weight.

Still a further object of the present invention is to provide a conveyor ball unit or a conveyor track of a structural configuration such as to provide that the forces involved in operation thereof are carried by the structure in a satisfactory manner.

In accordance with the present invention, these and other objects are achieved by a conveyor ball unit, for example for a conveyor track for carrying freight material, comprising a generally hollowcylindrical housing having a center axis which in use is at least substantially vertical. A conveyor ball member projects upwardly beyond the upwardly open end of the housing and is mounted rotatably in concentric relationship with the center axis on a plurality of mounting balls interposed between the conveyor ball and a mounting shell member. A ball guide means embraces the conveyor ball member in an annular configuration from above and secures the conveyor ball member and the mounting balls movably in the mounting shell member. A spring means which is supported on the housing of the unit biases the mounting shell member upwardly from below, with the conveyor ball member, mounting balls and mounting shell member being movable as a unit within the housing in such a way that it can be urged downwardly against the force of the spring means. The mounting shell member is generally of an aspherical configuration such that the conveyor ball is supported by the mounting balls only in an annular region of the mounting shell member, which is concentric with respect to the center axis of the unit. The spring means is in the form of a plurality or a pack of annular plate springs whose outside diameters are adapted to the adjacent inside diameter of the part of the housing in which the spring means is disposed. The mounting shell member is supported with its abovementioned annular region on the inward peripheral edge of the uppermost annular plate spring of the pack thereof.

It will be seen therefore that, with the above-defined configuration in accordance with the invention, it is particularly provided that the conveyor ball member is supported in symmetrical relationship with the center axis of the conveyor ball unit by way of a part of the mounting balls disposed in the mounting shell member, only on an annular region of the mounting shell member. By virtue of that configuration the conveyor ball member is automatically self-centering relative to the mounting shell member and that self-centering effect is maintained even when forces with a lateral component are applied downwardly on to the conveyor ball member.

As noted above, it is precisely by way of the abovementioned annular region that the mounting shell member itself bears against the upper inward peripheral edge of the uppermost plate spring of the spring means so that in turn the mounting shell member is automatically centered with respect to the annular plate springs. The annular plate springs in turn are suitably adapted with their outside diameters to the inside diameter of the cylindrical wall of the part of the housing in which the plate springs are disposed, so that the plate springs are held in centered relationship with respect to the housing and therewith also with respect to the center axis of the housing.

In summary therefore it can be said that the design configuration of the conveyor ball unit in accordance with the invention ensures that, when the conveyor ball member is subjected even to lateral force components acting thereon, the mounting ball member, the mounting shell member and the spring means are held automatically self-centering relative to each other and relative to the center axis of the housing, and that self-centering effect is maintained even when the entire assembly is caused to deflect downwardly within the housing against the force of the spring means, due to forces acting on the conveyor ball member. It is therefore virtually impossible in practice for those parts of the assembly to become jammed in the housing.

In that connection, it is particularly advantageous for the forces which are applied to the conveyor ball member from above to be transmitted to the mounting shell member directly by way of the mounting balls, with no forces thus acting on the ball guiding arrangement. The ball guiding arrangement therefore serves primarily and exclusively to prevent the mounting balls and the conveyor ball member from falling out of the mounting shell member when the unit is turned over.

Therefore, the annular portion of the ball guide means which embraces the conveyor ball member can involve considerable clearance relative to the periphery of the latter so that virtually no frictional forces occur between those components, thus ensuring that the conveyor ball member can roll easily. As the ball guide means does not have to carry substantial forces, it can be of a very light construction and can be produced for example from a plastic material.

Therefore, forces which are applied to the conveyor ball member by an article such as a freight container to be conveyor on a conveyor track in which the conveyor ball unit of the invention is disposed, in a generally downward direction and possibly with lateral components or components which are directed radially relative to the center axis of the unit, are transmitted by the conveyor ball member and by way of some of the mounting balls directly to the above-mentioned annular region of the mounting shell member and then by way of the plate springs directly to the cylindrical wall portion of the housing which in turn can transmit such forces over the shortest possible distance to the surrounding load-bearing structure of the panel or bed assembly of the conveyor track. That design configuration in accordance with the invention therefore provides a very satisfactory flow of forces, over the minimum distance that is reasonably possible, thereby making it possible for the individual components to be of a very light construction. The housing itself can be readily produced from thin-gauge plastic material as it is not exposed to any flexural loadings in the region in which the forces are transmitted.

From the point of view of production procedure it is advantageous if, in accordance with a preferred feature of the invention, the mounting shell member extends substantially over a hemispherical region which embraces the conveyor ball member from below and at a spacing therefrom.

A particularly preferred embodiment of the invention provides that the upper region of the mounting shell member, which extends as far as the edge thereof, is in the form of an annular portion of a sphere, the radius of which is slightly larger by a predetermined amount than the sum of the radius of the conveyor ball member and the diameter of the mounting balls. In addition the center point of the above-mentioned portion of the sphere lies on the center axis a predetermined distance above the center point of the conveyor ball member while disposed adjoining the lower edge of the annular portion of the sphere is a spherical segment which extends around the center axis in concentric relationship therewith and which bulges outwardly or is of a convex configuration in a downward direction, with the radius of the spherical segment being smaller than the radius of the annular portion of the sphere and the center point thereof lying a considerable distance below the center point of the conveyor ball member, on the center axis.

The above-defined configuration of the aspherical mounting shell member ensures that it has an annular mounting region for the conveyor ball member, in accordance with the teachings of this invention, and is advantageous from the point of view of production procedure. That construction provides that on the one hand there is small clearance in the upper edge region of the mounting shell member between the mounting balls and the conveyor ball member supported thereby, while on the other hand there is also small clearance in the central region around the center axis. That provides a further improvement in giving the desired annular mounting region for the mounting ball member, as well as ensuring that there is a low level of resistance to rolling movement of the assembly.

Advantageous geometrical configurations are achieved in connection with the mounting shell member if, in accordance with a preferred feature of the invention, the spherical segment, starting from the center point of the portion of the sphere, extends over an angle of from about 20° to 30°, with respect to the center axis. That causes the annular mounting region of the arrangement to be disposed at a location which is advantageous in regard to providing a good line of transmission of the forces involved.

Another preferred construction in accordance with the principles of the present invention provides that the ball guide means loosely embraces the conveyor ball member in an annular configuration, while a sealing lip for sealing relative to the conveyor ball member is disposed at the upper inner edge of the annular ball guide means. As the ball guide means does not perform a function of carrying forces and in particular is subjected to scarcely any loading in the lateral direction, such a sealing lip may bear against the conveyor ball member under a low contact pressure so that the resistance to rolling movement of the conveyor ball member remains low, in spite of the sealing lip providing a satisfactory seal.

It is further preferred that the ball guide means is provided at the peripheral edge thereof with a plurality of circumferentially distributed downwardly projecting snap-engagement projections which in the assembled condition of the arrangement engage snapingly under a substantially horizontal flange formed at the upper edge of the mounting shell member. After the mounting shell member, mounting balls, conveyor ball member and ball guide means have been assembled, that configuration holds the components together as a self-contained unit which also moves as a unit downwardly within the housing against the force of the spring means as soon as a downwardly directed force is applied to the conveyor ball member.

In a preferred feature of the invention the ball guide means is formed in one piece from plastic material, which means that both the above-mentioned sealing lips and also the snap-engagement projections constitute parts of the ball guide means and are formed in one piece therewith.

Further objects, feature and advantages of the present invention will be apparent from the following description of a preferred embodiment thereof.

DESCRIPTION OF THE PREFERRED EMBODIMENT

Figure 1:
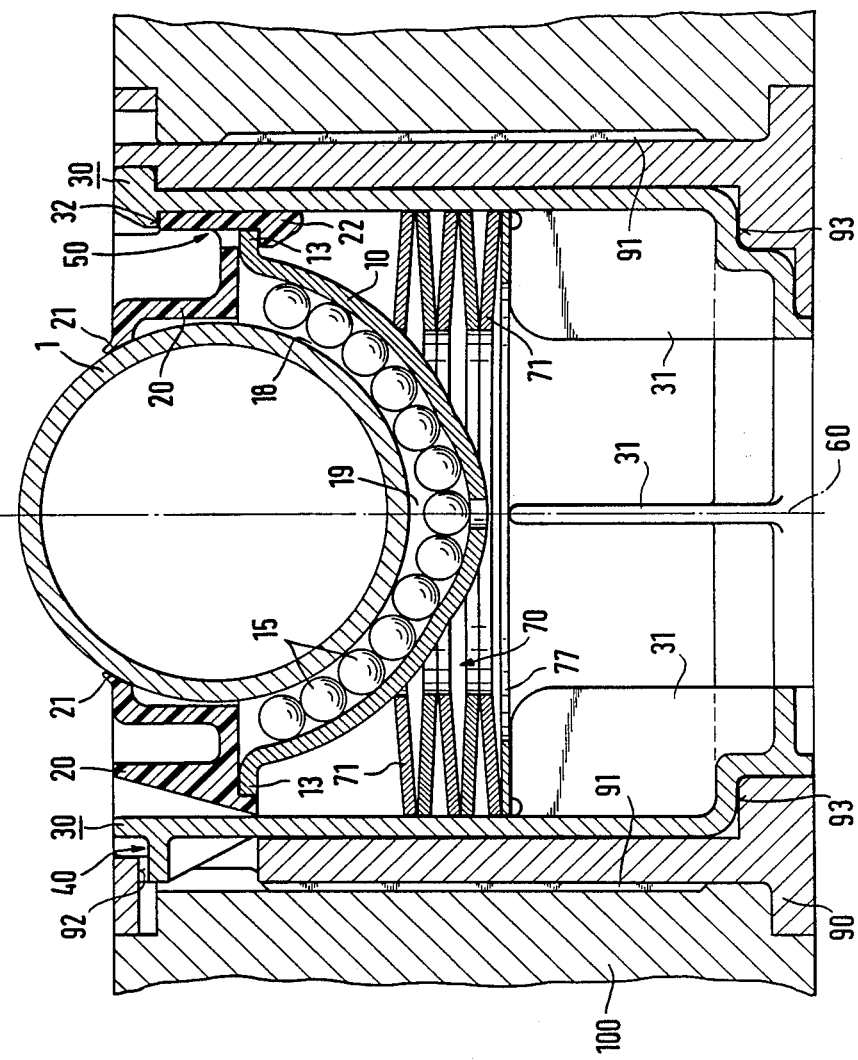
FIG. 1 is a view in vertical section along the center axis of the housing taken along line I—I in FIG. 2.
Figure 2:
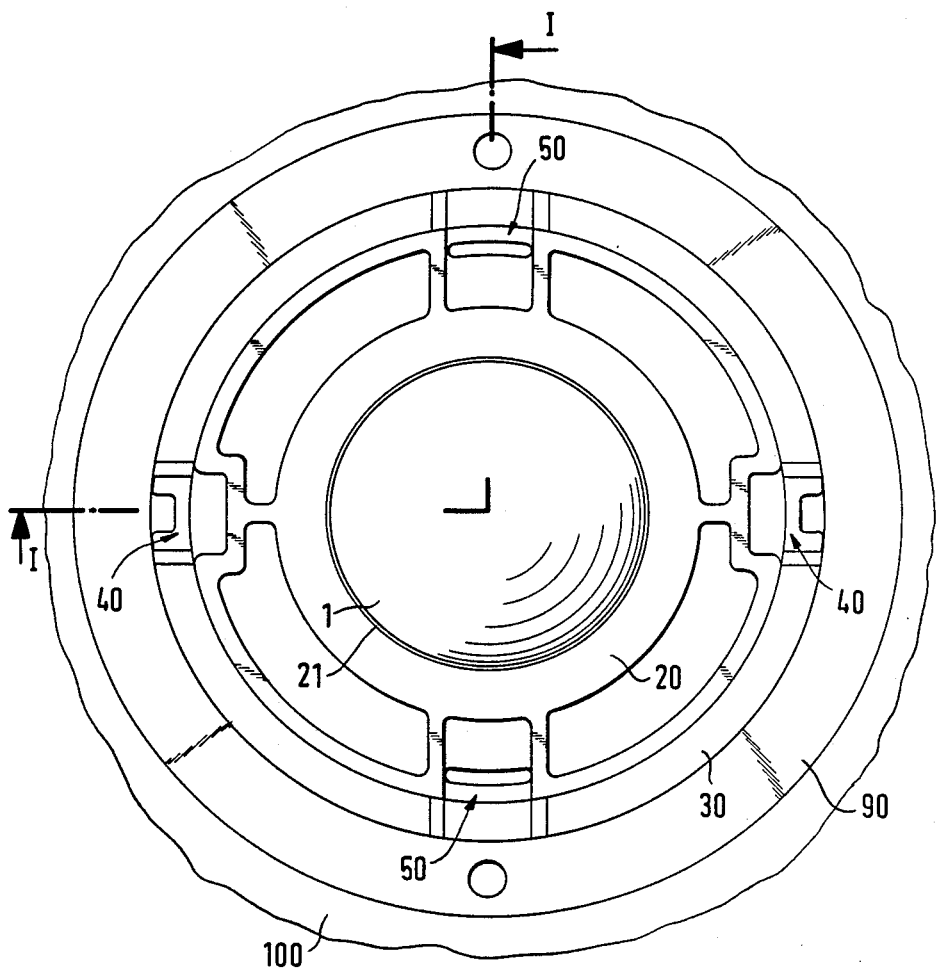
FIG. 2 is a plan view of the conveyor ball unit shown in FIG. 1 and a broken-away part of the surrounding panel or bed construction of a conveyor track.

Referring firstly to FIGS. 1 and 2, shown therein is an embodiment of a conveyor ball unit in accordance with the principles of this invention, which is disposed in a panel or bed portion 100 of a conveyor track, for example for moving freight material such as freight containers, and the like. The portion 100 comprises for example a composite fiber material and pressed or cast thereinto, for holding a conveyor ball unit, is a generally substantially hollow-cylindrical sleeve member 90 which is provided on its outward peripheral surface with grooving or knurling as indicated at 91. The sleeve member 90 may comprise for example metal such as a light metal alloy. At its upper edge as shown in FIG. 1 the sleeve member 90 is provided with locking shoulders 92 which are distributed around the periphery thereof.

Disposed within the sleeve member 90 is a conveyor ball unit in accordance with the invention. The conveyor ball unit comprises a housing 30 which carries locking elements as indicated at 40 which suitably engage with a snap-fitting action under the locking shoulders 92 of the sleeve member 90, in the inserted position of the conveyor ball unit, in order thereby to hold the conveyor ball unit in the panel portion 100.

At its lower edge in FIG. 1 the sleeve member 90 is provided with an inwardly projecting annular flange 93, on which a suitably shaped shoulder portion of the housing 30 of the conveyor ball unit is supported in the inserted position of the conveyor ball unit. As can be seen from the sectional view in FIG. 1, the housing 30 and the sleeve member 90 are of an asymmetric configuration relative to the center axis 60 of the housing 30 in the region of the annular flange 93 so that the conveyor ball unit is held non-rotatably in the sleeve member 90. As considered from the outside, the housing 30 of the conveyor ball unit is generally in the form of a substantially hollow-cylindrical member, with the outside diameter thereof being suitably matched to the inside diameter of the sleeve member 90.

As can be seen more particularly from FIG. 1, arranged in the interior of the housing 30 in concentric relationship with the center axis 60 thereof is an upwardly open, generally hemispherical mounting shell member which is generally indicated by reference numeral 10. Disposed in the mounting shell member 10 is a plurality of mounting balls 15 disposed therein in juxtaposed relationship in such a way as to provide a layer of balls covering the inside surface, which faces upwardly in FIG. 1, of the mounting shell member 10. A conveyor ball member 1 is mounted rotatably on the mounting balls 15.

The conveyor ball member 1 is partially surrounded or embraced from above by a substantially annular ball guide member 20 having an upward opening through which the upper portion of the conveyor ball member 1 projects upwardly beyond the upwardly facing surface of the panel or bed portion 100 of the conveyor track. The upper opening of the ball guide member 20 is of such a configuration as to provide a sealing lip 21 which bears sealingly and slidably against the conveyor ball member 1. The remaining part of the ball guide member 20, which is in the form of an annular component, is designed to have a clearance relative to the conveyor ball member 1.

Formed on the ball guide member 20 at the outward lower edge thereof is a plurality of downwardly extending snap-engagement projections or noses 22 which are distributed around the periphery of the ball guide member 20 and which, in the assembled condition of the components, engage with a snap fit under a horizontal annular flange 13 which is formed at the upper edge of the mounting shell member 10 in radially outwardly projecting relationship thereon. The snap-engagement projections 22 provide that the conveyor ball member 1, the mounting balls 15 and the ball guide member 20 are held together as a unit in the assembled condition thereof so that neither the mounting balls 15 nor the conveyor ball member 1 can fall out of the mounting shell member 10, by movement upwardly therefrom.

In addition, distributed over the periphery of the ball guide member 20 on the outside thereof are locking or latching members 50 which permit the assembled unit consisting of the mounting shell member 10 with the mounting balls 15 and the conveyor ball member 1 to be inserted with a snap-engagement action downwardly into the housing 30. In the inserted condition of the unit, the locking elements 50 engage under a locking shoulder 32 which is formed on the housing 30 at the upward inward edge thereof. The outside periphery of the ball guide member 20 is adapted in regard to its diameter to the inside diameter of the housing 30 so that the unit consisting of the conveyor ball member 1, the mounting balls 15, the mounting shell member 10 and the ball guide member 20 can move slidingly up and down within the housing 30, along the center axis thereof, while nonetheless being prevented by the shoulders 32 and the locking elements 50 from coming out of the housing 30 in an upward direction.

Figure 3:
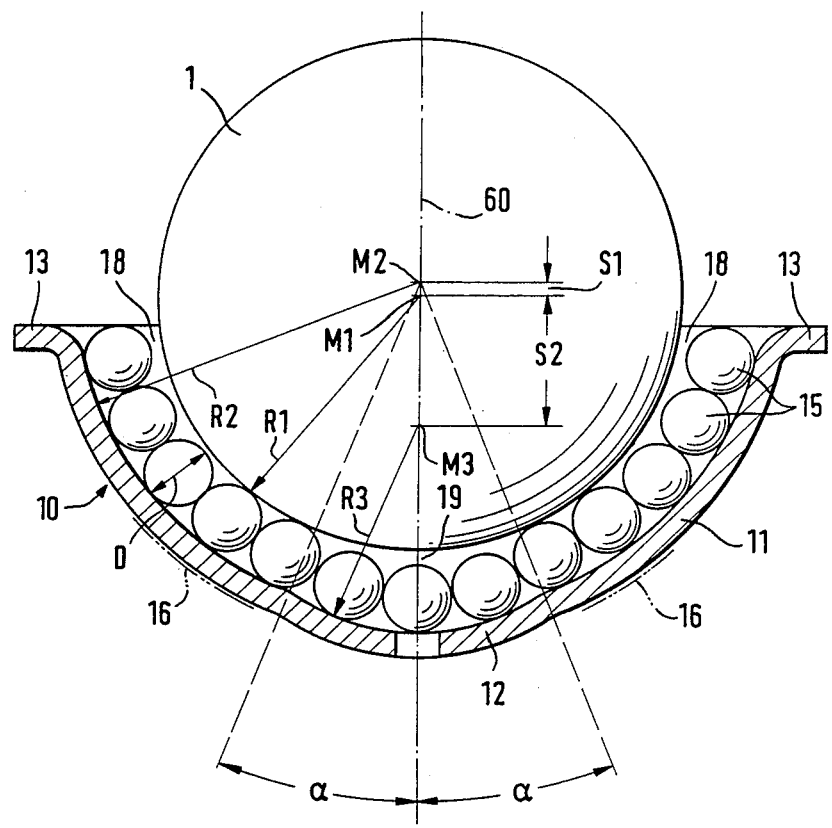
FIG. 3 is a highly diagrammatic sectional view, which is not to scale, of the conveyor ball member, the mounting balls and the mounting shell member.

Referring still to FIG. 1 and looking also at FIG. 3, it will be seen that, although the mounting shell member 10 extends at a spacing from the surface of the conveyor ball member 1 over a generally hemispherical region, the mounting shell member 10 is nonetheless of an aspherical configuration such that the conveyor ball member 1 is only supported by way of a portion of the mounting balls 15 on an annular region of the mounting shell member 10, which is identified by reference numeral 16 in FIG. 3. Outside that annular region 16, there is some clearance between the mounting balls 15 and the conveyor ball member 1, more specifically, there is a small gap as indicated at 18 between the mounting balls 15 and the conveyor ball member 1 in the upper peripheral region of the mounting shell member 10, while there is another small gap as indicated at 19 in the lower region of the arrangement around the center axis 60.

Referring still to FIG. 1, approximately in the lower third of its vertical dimension, the housing 30 is provided with a plurality of radially inwardly projecting ribs 31 on which a spring arrangement 70 is suitably supported, with the interposition of a mounting ring 77. The spring arrangement 70 comprises a pack of annular plate springs 71 in mutually superposed relationship, of the configuration and in the manner clearly shown in FIG. 1. The uppermost one of the springs 71 bears with its inward upper edge against the mounting shell member 10 on the outside surface thereof, that is to say the surface which faces downwardly in FIG. 1, in the above-mentioned annular region indicated at 16 in FIG. 1. The outer periphery of the springs 71 is suitably matched to the inner periphery of the housing 30. The height of the spring arrangement 70 is such that the complete unit which is carried in the mounting shell member 10 is urged upwardly in the non-loaded condition of the conveyor ball member 1 so that the locking elements 50 bear against the locking shoulders 32 provided by the housing 30. That therefore is the position of the arrangement as illustrated in FIG. 1.

As already indicated above, the particular aspherical configuration of the mounting shell member 10 provides that the conveyor ball member 1 is supported only in an annular region 16 which is concentric with respect to the center axis 60, by way of some of the mounting balls 15. That provides that the conveyor ball 1 is automatically centered in the mounting shell member 10 and that the centering effect is maintained even when for example freight containers which are carried on the conveyor ball member 1 cause the conveyor ball member 1 to be subjected from above to forces which also include a lateral component, that is to say a component which is directed radially with respect to the center axis 60.

The mounting shell member 10 is in turn supported in the annular spring arrangement 70 precisely at the location of the above-mentioned annular region 16. As the spring arrangement 70 is carried in the housing 30, with the outside periphery thereof being a suitably close fit therein, that ensures that the mounting shell member 10 is also held with a self-centering action in relation to the center axis 60 of the housing 30. That in turn provides that forces which act on the conveyor ball member 1 downwardly, while including a lateral component, are transmitted by way of the annular region 16 of the mounting shell member 10 to the spring arrangement 70 and from there directly to the panel or bed portion 100 of the surrounding conveyor track structure by way of the wall of the housing 30 and the surrounding sleeve member 90. In that situation the vertical components of the forces involved pass by way of the spring arrangement 70, possibly causing resilient compression thereof, and by way of the mounting ring 77, to the ribs 31 of the housing 30, from which the forces involved are transmitted predominantly by way of the annular flange 93 of the sleeve member 90 to the panel or bed portion 100 and to the structure carrying same. That arrangement therefore provides a highly advantageous path for the transmission of forces, both in respect of vertical forces and also forces which are radial with respect to the center axis 60, without the components involved being subjected to flexural loadings.

More particularly however the above-indicated configuration ensures that the ball guide member 20 remains practically free of any loading when the conveyor ball member 1 is put under load. The ball guide member 20 can thus be in the form of a light simple component made for example of plastic material, while the sealing lips 21, the snap-engagement projections 22 and the locking elements 50 can be made integrally therewith.

By virtue of the self-centering mounting action in respect of the conveyor ball member 1 and the mounting shell member 2, the illustrated arrangement also ensures that when the conveyor ball member 1 is deflected downwardly under a loading applied thereto, against the force of the spring arrangement 20, the mounting shell member 10 and the ball guide member 20 which is locked thereto suffer from substantially no tilting movement within the housing 30.

Reference will now be made more specifically to FIG. 3 which is a diagrammatic view of the configuration of the mounting shell member 10 of the conveyor ball unit according to the invention, such as to provide that the conveyor ball member 1 is supported only on an annular region 16, in the normal operating position thereof. It will be appreciated in that respect that the conveyor ball member 1 may be deflected for example laterally to come into contact with mounting balls 15 at the location of the gaps 18 indicated in FIG. 3, under the effect of lateral forces applied thereto, thus giving rise to a situation in which the conveyor ball member 1 is also supported against the lateral mounting balls 15. In general however the conveyor ball member 1 and the weight of for example a freight container supported thereon is carried by the mounting balls 15 in the annular region 16 of the mounting shell member 10.

As illustrated, the mounting shell member 10 has an upper part in the form of an annular portion of a sphere as indicated at 11, with the horizontal flange being formed on the upper edge thereof. The radius R2 of the upper annular portion 11 is slightly larger than the sum of the radius R1 of the conveyor ball member 1 and the diameter D of the mounting balls 15 and the center point M2 of the annular portion of the sphere 11 lies a small distance S1 above the center point M1 of the conveyor ball member 1 on the center axis 60. The lower edge of the annular portion of the sphere 11 goes into a spherical segment 12 which is disposed concentrically around the center axis 60 and the radius R3 of which is smaller than R1 or R2 and whose center point M3 is disposed a considerable distance S2 below the center point M1 on the center axis 60 so that the segment 12 is bulged outwardly and downwardly in Figure 3, with respect to the annular portion 11 of the sphere. The positions of the center point M3 and the dimensional relationships of the radii are so selected that, starting from the center point M2, the segment 12 extends around the center axis 60 approximately over an angle as indicated by $\alpha$ of 20° to 30°.

In a practical construction, the dimensions set out below were used by way of example:

| | |
|---|---|
| R1 = 12.300 mm | D = 3.175 mm |
| R2 = 16.020 mm | S1 = 0.600 mm |
| R3 = 10.000 mm | S2 = 6.215 mm |

Besides the ball guide member 20, it is also possible for the entire housing 30 of the conveyor ball unit to be made from plastic material as the parts of the housing 30 which transmit a substantial force are only subjected to a compression stress. Besides low production costs, that also makes it possible to provide a construction which is low in weight.

It will be appreciated that the above-described conveyor ball unit in accordance with the invention has only been set forth by way of example and illustration thereof and that various other modifications and alternations may be made therein without thereby departing from the spirit and scope of the invention.

What is claimed is:

1. A conveyor ball unit for a conveyor track comprising: a housing defining a recess therein having a center axis and an opening which in a position of use of the conveyor ball unit faces upwardly; a mounting shell means disposed in said recess; a spring means operatively disposed between said mounting shell means and said housing to urge said mounting shell means towards said opening; a plurality of mounting balls disposed on said mounting shell means; a conveyor ball member which is mounted rotatably in concentric relationship with the center axis of said housing on said mounting balls and which projects through said opening outwardly of said housing; a ball guide means extending around said conveyor ball member in an annular configuration thereby to secure said conveyor ball member and therewith said mounting balls movably on said mounting shell means, whereby said conveyor ball member, said mounting balls and said mounting shell means constitute an assembly movably disposed in said housing and adapted to be urged downwardly along said axis against the force of said spring means;

said mounting shell means being generally of an aspherical configuration such as to define an annular region of said mounting shell means, which is concentric with respect to said center axis and so disposed that said conveyor ball member is supported by way of said mounting balls only at said annular region;

said spring means being in the form of a pack of annular plate springs of an outside dimension adapted to the adjoining inside dimension of said recess of said housing; and said mounting shell means being supported by way of said annular region thereof on the inward edge of the uppermost annular plate spring of said pack;

wherein said ball guide means loosely embraces the conveyor ball member in an annular configuration, and further including a sealing lip, adapted to seal relative to the conveyor ball member, disposed at an upper inner edge portion of said annular ball guide means;

wherein said mounting shell means includes a horizontal flange portion at its upper edge, and wherein said ball guide means is provided at the peripheral edge thereof with a plurality of circumferentially distributed snap-engagement projections which in the assembled condition engage snappingly under said flange portion.

2. A conveyor ball unit as set forth in claim 1 wherein said mounting shell means extends substantially over a hemispherical region embracing the conveyor ball from below at a spacing therefrom.

3. A conveyor ball unit as set forth in claim 1 wherein the mounting shell means includes an upper region which extends to the edge thereof and is in the form of an annular portion of a sphere having a radius which is slightly larger by a predetermined amount than the sum of the radius of the conveyor ball member and the diameter of the respective mounting balls, wherein the center point of said portion of a sphere lies on the center axis above the center point of the conveyor ball member by a predetermined distance, and wherein disposed adjoining the lower edge of said portion of a sphere is a spherical segment which extends around the center axis in concentric relationship therewith and which bulges out in a downward direction and which is of a radius smaller than the radius of the said portion of a sphere and which has a center point disposed below the center-point of the conveyor ball member by a substantial distance on the center axis.

4. A conveyor ball unit as set forth in claim 3 wherein said spherical segment, starting from the center point of said portion of a sphere, extends over an angle of about 20° to 30° with respect to the center axis.

5. A conveyor ball unit as set forth in claim 1 wherein said ball guide means is formed integrally from plastic material.

* * * * *